United States Patent
Döbler et al.

(10) Patent No.: US 6,914,092 B1
(45) Date of Patent: Jul. 5, 2005

(54) ANTISTATIC AGENT

(75) Inventors: Martin Döbler, Düsseldorf (DE);
Walter Köhler, Duisburg (DE); Peter Bier, Krefeld (DE); Wolfgang Ebert, Krefeld (DE); Rüdiger Gorny, Krefeld (DE); Siegfried Neumann, Tönisvorst (DE)

(73) Assignee: Bayer Aktiengesellschaft, Leverkusen (DE)

( * ) Notice: Subject to any disclaimer, the term of this patent is extended or adjusted under 35 U.S.C. 154(b) by 337 days.

(21) Appl. No.: 10/049,837

(22) PCT Filed: Aug. 3, 2000

(86) PCT No.: PCT/EP00/07524

§ 371 (c)(1),
(2), (4) Date: Feb. 13, 2002

(87) PCT Pub. No.: WO01/12713

PCT Pub. Date: Feb. 22, 2001

(30) Foreign Application Priority Data

Aug. 16, 1999 (DE) .......................................... 199 38 735
Sep. 13, 1999 (DE) .......................................... 199 43 637

(51) Int. Cl.⁷ .............................. C08K 5/17; C08K 5/41
(52) U.S. Cl. ........................ 524/157; 524/154; 524/159; 524/169; 524/236

(58) Field of Search ................................ 524/154, 159, 524/169, 236, 157

(56) References Cited

U.S. PATENT DOCUMENTS

| | | | | |
|---|---|---|---|---|
| 4,007,150 A | * | 2/1977 | Adelmann et al. | 524/87 |
| 4,112,206 A | | 9/1978 | Wingrave | 526/3 |
| 4,570,197 A | | 2/1986 | Hakanson et al. | 350/132 |
| 4,976,741 A | | 12/1990 | Hisamoto et al. | 8/115.6 |
| 6,194,497 B1 | * | 2/2001 | Willems et al. | 524/165 |

FOREIGN PATENT DOCUMENTS

| | | |
|---|---|---|
| DE | 42 22 448 | 1/1993 |
| EP | 0 340 618 | 11/1989 |
| JP | 62-230835 | 9/1987 |
| JP | 6-228420 | 8/1994 |

* cited by examiner

Primary Examiner—Tae H. Yoon
(74) Attorney, Agent, or Firm—Joseph C. Gil; Aron Preis

(57) ABSTRACT

An agent suitable for imparting antistatic properties to plastics is disclosed. The incorporation of small amounts of perfluoroalkylsulfonic acid salt in plastic resins, notably thermoplastic resins was found to be effective for this purpose.

5 Claims, No Drawings

ANTISTATIC AGENT

This application relates to the use of fluorinated alkylsulfonic acids salts as an antistatic agent in particular in plastics and to plastics containing fluorinated alkylsulfonic acid salts and to mouldings producible therefrom.

The deposition of dust to form dust figures is a widespread problem with plastics mouldings, c.f. in this connection for example Saechtling *Kunststoff-Taschenbuch*, 26th edition, Hanser Verlag, 1995, Munich, pp. 140 et seq. Dust deposits on transparent mouldings are particularly troublesome and restrict function. Such mouldings are used, for example, for applications in optical data storage media, electrical engineering, automotive engineering, in the building sector, for liquids containers or for other optical applications. Dust deposition is undesirable for all these applications and may impair function.

One known method for reducing the deposition of dust on plastic articles is to use antistatic agents. The literature contains descriptions of antistatic agents for thermoplastics which restrict dust deposition (c.f. for example Gächter, Müller, *Plastic Additives*, Hanser Verlag, Munich, 1996, pp. 749 et seq.). These antistatic agents improve the electrical conductivity of the plastics moulding compositions and thus dissipate any surface charges which develop during production and use. Dust particles are thus less attracted and dust deposition is consequently reduced.

A distinction is generally drawn between internal and external antistatic agents. An external antistatic agent is applied onto the plastics moulding after processing, while an internal antistatic agent is added as an additive to the plastics moulding compositions. On economic grounds, it is usually desirable to use internal antistatic agents, as no further operations for applying the antistatic agent are required after processing. Few internal antistatic agents have hitherto been described in the literature which also form completely transparent mouldings, especially with polycarbonate. JP-06228420 A 940816 describes aliphatic sulfonic acid ammonium salts as an antistatic agent in polycarbonate. However, these compounds bring about a reduction in molecular weight. JP-62230835 describes the addition of 4% of nonylphenylsulfonic acid tetrabutylphosphonium to polycarbonate.

One disadvantage of known antistatic agents is that they must be used in relatively high concentrations in order to achieve the antistatic effect. However, such addition modifies the material properties of the plastics in an unwanted manner.

The object of the invention is accordingly to provide antistatic agents which have no negative impact on the material properties of plastics.

It has surprisingly been found that perfluoroalkylsulfonic acid salts are particularly suitable as antistatic agents for the production of injection moulded and extruded mouldings. Even small quantities of perfluoroalkylsulfonic acid salt give rise to mouldings which no longer attract dust.

This application accordingly provides the use of perfluoroalkylsulfonic acid salts as antistatic agents, in particular for plastics, in particular for transparent plastics, as well as plastics, plastics moulding compositions and plastics mouldings containing at least one perfluoroalkylsulfonic acid salt.

Preferably suitable perfluoroalkylsulfonic acid salts are salts of the type (I)

$$RA\text{—}SO_3\, X \quad (I)$$

in which
R means perfluorinated linear or branched carbon chains having 1 to 30 carbon atoms, preferably 4 to 8 carbon atoms;

A means a direct bond or an aromatic nucleus, for example and preferably fluorinated or non-fluorinated o-, m- or p-phenylene;

X means an alkylated and/or arylated ammonium ion NR'R"R'"R"", phosphonium ion PR'R"R'"R"", sulfonium ion SR'R"R'", and substituted or unsubstituted imidazolinium ion, pyridinium ion or tropylium ion, in which R', R", R'", R""mutually independently denote halogenated or non-halogenated, linear or branched carbon chains having 1 to 30 carbon atoms, preferably 1 to 4 carbon atoms, in particular methyl, ethyl, propyl, butyl, pentyl, hexyl, isopropyl, isobutyl, tert.-butyl, neopentyl or aromatic residues or alkylaromatic residues such as for example and preferably phenyl, benzyl, alkylphenyl in each case having 1 to 4 carbon atoms in the alkyl portion.

The following are preferred:
perfluorooctanesulfonic acid tetraethylammonium salt,
perfluorobutanesulfonic acid tetraethylammonium salt,
perfluorooctanesulfonic acid tetrabutylphosphonium salt,
perfluorobutanesulfonic acid tetrabutylphosphonium salt,
perfluorooctanesulfonic acid benzyltrimethylammonium salt,
perfluorobutanesulfonic acid benzyltrimethylammonium salt,
perfluorooctanesulfonic acid trimethylphenylammonium salt,
perfluorobutanesulfonic acid trimethylphenylammonium salt,
perfluorobutanesulfonic acid dimethyldiphenylammonium salt,
perfluorooctanesulfonic acid dimethyldiphenylammonium salt,
perfluorobutanesulfonic acid trimethylneopentylammonium salt,
perfluorooctanesulfonic acid trimethylneopentylammonium salt,
perfluorobutanesulfonic acid dimethyldineopentylammonium salt,
perfluorooctanesulfonic acid dimethyldineopentylammonium salt,
perfluorobutanesulfonic acid tetrabutylphosphonium salt,
perfluorooctanesulfonic acid tetrabutylphosphonium salt.

Mixtures of sulfonic acid salts, in particular of the above-stated sulfonic acid salts, are also preferred.

Perfluorooctanesulfonic acid tetraethylammonium salt is particularly preferred.

Perfluoroalkylsulfonic acid salts are known or may be produced using known methods. The salts of the sulfonic acids may be produced by combining equimolar quantities of the free sulfonic acid with the hydroxy form of the corresponding cation in water at room temperature and evaporating the solution.

The perfluoroalkylsulfonic acids are preferably added to the plastics in quantities of 0.001 to 2 wt. %, preferably of 0.1 to 1 wt. %.

Plastics are preferably taken to mean thermoplastics, in particular transparent thermoplastics, preferably the polymers of ethylenically unsaturated monomers and/or polycondensation products of difunctional reactive compounds.

Particularly suitable plastics are polycarbonates or copolycarbonates based on diphenols, poly- or copolyacrylates and poly- or copolymethacrylates such as for example and preferably polymethyl methacrylate, poly- or copolymers with styrene such as for example and preferably transparent polystyrene or styrene/acrylonitrile copolymer (SAN), transparent thermoplastic polyurethanes, and polyolefins, such as for example and preferably transparent grades of polypropylene or polyolefins based on cyclic olefins (for example TOPAS®, Hoechst), poly- or copoly-condensation products of terephthalic acid, such as for example and preferably poly- or copolyethylene terephthalate (PET or CoPET) or glycol-modified PET (PETG).

Polycarbonates or copolycarbonates are particularly preferred, in particular non-halogenated polycarbonates and/or copolycarbonates having molecular weights $\overline{M}_w$ of 500 to 100,000, preferably of 10,000 to 50,000, particularly preferably of 15,000 to 40,000.

For the purposes of the present invention, thermoplastic, aromatic polycarbonates comprise both homopolycarbonates and copolycarbonates; the polycarbonates may be linear or branched in known manner.

The polycarbonates according to the invention may also be present in entirely or partially brominated form.

These polycarbonates are produced in known manner from diphenols, carbonic acid derivatives, optionally chain terminators and optionally branching agents.

Details of the production of polycarbonates have been described in many patents over the last 40 years or so. Reference is made purely by way of example to Schnell, "Chemistry & Physics of Polycarbonates", *Polymer Reviews*, vol. 9, Interscience Publishers, New York, London, Sydney 1964, to D. Freitag, U. Grigo, P. R. Müller, H. Nouvertne', Bayer AG, "Polycarbonates" in *Encyclopedia of Polymer Science & Engineering*, vol. 11, $2^{nd}$ edition, 1988, pp. 648–718 and finally to Dr. U. Grigo, Dr. K. Kirchner and Dr. P. R. Müller, "Polycarbonate" in Becker/Braun, *Kunststoff-Handbuch*, vol. 3/1, *Polycarbonate, Polyacetale, Polyester, Celluseester*, Carl Hanser Verlag, Munich/Vienna, 1992, pp. 117–299.

Preferred diphenols for the production of polycarbonates are:
4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl) sulfone, 2,4-bis-(3,5-dimethyl-4-hydroxyphenyl)2-methylbutane, 1,1-bis-(3,5-dimethyl-4-hydroxyphenyl)-p-diisopropylbenzene, 2,2-bis-(3,5-dichloro-4-hydroxyphenyl)propane, 2,2-bis-(3,5-dibromo-4-hydroxyphenyl)propane and 1,1-bis-(4-hydroxyphenyl)-3,3,5-trimethylcyclohexane.

Particularly preferred diphenols are 2,2-bis-(4-hydroxyphenyl)propane, 2,2-(3,5-dimethyl-4-hydroxyphenyl)propane, 2,2-bis-(3,5-dichloro-4-hydroxyphenyl)propane, 2,2-bis-(3,5-dibromo-4-hydroxyphenyl)propane, 1,1-bis-(4-hydroxyphenyl)cyclohexane and 1,1-bis-(4-hydroxyphenyl)-3,3,5-trimethylcyclohexane.

Preferred branching agents are triphenols, trimesic acid (trichloride), cyanuric acid trichloride and 3,3-bis-(3-methyl-4-hydroxyphenyl)-2oxo-2,3-dihydroindole.

Improved plastics compositions may be obtained by incorporating at least one further additive conventionally present in thermoplastics, preferably poly- and copolycarbonates, such as for example stabilisers (as described, for example, in EP 0 839 623 A1 or EP 0 500 496 A1), especially heat stabilisers, in particular organic phosphites or phosphines, for example and preferably triphenylphosphine, mould release agents, for example and preferably fatty acid esters of glycerol or tetramethanolmethane, wherein unsaturated fatty acids may be entirely or partially epoxidised, in particular glycerol monostearate or pentaerythritol tetrastearate (PETS), flame retardants, UV absorbents, for example and preferably hydroxybenzotriazoles and hydroxytriazines, fillers foaming agents, dyes, pigments, optical brighteners, transesterification catalysts and nucleating agents or the like, preferably in quantities of in each case up to 5 wt. %, preferably of 0.01 to 5 wt. %, relative to the entire mixture, particularly preferably of 0.01 wt. %, relative to the quantity of plastics.

The perfluoroalkylsulfonic acid salts and optionally the additives or mixtures of additives are generally incorporated in the conventional manner for example before or during polymerisation or by subsequent mixing with the plastic.

The plastics compositions obtained in this manner are generally in the form of solutions, dispersions, emulsions, finely divided solids, powders, pellets, platelets or flakes (moulding compositions) and are used for the production of shaped articles (mouldings).

Shaped articles are for example and preferably light-transmitting articles such as for example and preferably light diffusers for motor vehicles, lenses, such as for example spectacle lenses, films, tapes, sheets, multi-wall sheets, multiple wall sheets, containers, tubes and other profiles which are produced using conventional methods, such as for example hot pressing, spinning, extrusion or injection moulding. The polymer compositions may also be converted into cast films.

It is also of interest to use the plastics composition according to the invention for the production of multilayer systems. In such cases, the plastics composition according to the invention is applied in a thin layer onto a shaped article of a plastic which does not have an antistatic finish or additive. Application may proceed simultaneously with or immediately after shaping of the moulding, for example by coextrusion or multi-component injection moulding. Application may, however, also be performed onto the pre-shaped substrate, for example by lamination with a film or coated with a solution.

It is furthermore of interest to use the plastics compositions according to the invention for the production of casings for electrical and electronic appliances, such as for example televisions, monitors, computers, printers, mobile telephones, clocks, hi-fi systems and the like in any desired colours with a transparent, translucent or opaque formulation, optionally with a flame-retardant finish or additive.

Plastics compositions containing perfluoroalkylsulfonic acid ammonium salts are preferably used for the production of light diffusers for motor vehicles.

It is also of particular interest to use plastics compositions containing perfluoroalkylsulfonic acid salts for the production of sheet, double-wall sheet, coextruded sheet and film.

The advantage of the plastics mouldings provided with the antistatic agents according to the invention is that these mouldings no longer develop a static charge, for example during production, when the conventionally used protective films are peeled off or during transport and storage.

The following Examples illustrate the invention. The invention is not limited to the Examples. The percentages stated below are weight percentages.

Dust Test

In order to test dust deposition in a laboratory test, the injection moulded sheets are exposed to an atmosphere containing a suspended dust. To this end, a 2 liter breaker containing an 80 mm long magnetic stirrer rod of a triangular cross-section is filled to a depth of approx. 1 cm with dust (coal dust/20 g activated carbon, Riedel de Haen, Seelze, Germany, item no. 18003). The dust is suspended in the atmosphere with a magnetic stirrer. Once the stirrer has been shut off, the test specimen is exposed to this dusty atmosphere for 7 seconds. Depending upon the test specimen used, a greater or lesser amount of dust is deposited on the test specimens.

Evaluation of dust deposition (dust figures) is performed visually. Sheets exhibiting dust figures were rated (−), while virtually dust-free sheets were rated (+).

EXAMPLE 1

In order to produce the test specimens, an additive-free, unstabilised polycarbonate (Makrolon® 2808 from Bayer AG, Leverkusen) having an average molecular weight of approx. 30,000 ($M_w$ by GPC), solution viscosity: η=1.293 at 340° C., is compounded in a twin screw extruder with the quantity of perfluorooctanesulfonic acid tetraethylammonium salt (Bayowet 248® from Bayer AG, Leverkusen) and the other stated additives in Table 1 and then pelletised.

Rectangular sheets (155 mm×75 mm×2 mm) are then injection moulded from these pellets at various melt temperatures and subjected to the dust test. The results are state in Table 2.

TABLE 1

Plastics compositions

| Example | Composition |
|---|---|
| 1.1 | 1% Bayowet 248 ® + 0.025% triphenylphosphine + 0.3% 2-(2'-hydroxy-3'-(2-butyl)-5'-(tert-butyl)phenyl)benzotriazole (Tinuvin ® 350, Ciba Spezialitaatenchemie, Basel) |
| 1.2 | 0.6% Bayowet 248 ® + 0.025% triphenylphosphine + 0.3% 2-(2'-hydroxy-3'-(2-butyl)-5'-(tert-butyl)phenyl)benzotriazole |
| 1.3 | 0.4% Bayowet 248 ® + 0.025% triphenylphosphine + 0.3% 2-(2'-hydroxy-3'-(2-butyl)-5'-(tert-butyl)phenyl)benzotriazole |
| 1.4 | 0.3% Bayowet 248 ® + 0.025% triphenylphosphine + 0.3% 2-(2'-hydroxy-3'-(2-butyl)-5'-(tert-butyl)phenyl)benzotriazole |
| 1.5 | 0.25% Bayowet 248 ® + 0.025% triphenylphosphine + 0.3% 2-(2'-hydroxy-3'-(2-butyl)-5'(tert-butyl)phenyl)benzotriazole |
| 1.6 | 0.2% Bayowet 248 ® + 0.025% triphenylphosphine + 0.3% 2-(2'-hydroxy-3'-(2-butyl)-5'-(tert-butyl)phenyl)benzotriazole |
| 1.7 | 0.15% Bayowet 248 ® + 0.025% triphenylphosphine + 0.3% 2-(2'-hydroxy-3'-(2-butyl)-5'-(tert-butyl)phenyl)benzotriazole |
| 1.8 | 0.1% Bayowet 248 ® + 0.025% triphenylphosphine + 0.3% 2-(2'-hydroxy-3'-(2-butyl)-5'-(tert-butyl)phenyl)benzotriazole |

All the colour sample sheets produced from the plastics compositions of Examples 1.1 to 1.8 at melt temperatures a), b) and c) are completely transparent on visual inspection.

TABLE 2

Results of dust test

| Example | a) 300° C. | b) 320° C. | c) 330° C. |
|---|---|---|---|
| 1.1 | + | | |
| 1.2 | + | | |
| 1.3 | + | + | + |
| 1.4 | − | + | + |
| 1.5 | − | + | + |
| 1.6 | − | + | + |
| 1.7 | − | + | + |
| 1.8 | − | − | + |

EXAMPLE 2

Polycarbonate films of a thickness of 0.25 mm based on the polycarbonate Makrolon 3100® from Bayer AG, Leverkusen and the antistatic agent contents stated in Table 3 are produced by extrusion at a melt temperature of 280° C. Antistatic action is determined by measuring surface conductivity to DIN IEC 93 (Ω).

TABLE 3

Plastics film composition

| Example | Composition | Dust test | Surface conductivity |
|---|---|---|---|
| 2.1 | No additions | − | $1.0 \cdot 10^{17}$ 106 |
| 2.2 | 0.3% Bayowet 248 ® | + | $2.7 \cdot 10^{15}$ Ω |
| 2.3 | 0.5% Bayowet 248 ® | + | $8.2 \cdot 10^{13}$ Ω |
| 2.4 | 1% Bayowet 248 ® | + | $2.9 \cdot 10^{13}$ Ω |
| 2.5 | 1.5% Bayowet 248 ® | + | $6.0 \cdot 10^{12}$ Ω |

Surface resistance is reduced by almost 2 orders of magnitude by the addition of 0.3 wt. % of Bayowet® 248 and by more than 4 orders of magnitude by the addition of 1.5 wt. %. This is significantly better than the values hitherto described for antistatic agents in this range of concentrations in polycarbonate.

EXAMPLE 3

The compositions stated in Table 4 are produced according to Example 1 and subjected to the dust test. The perfluorobutanesulfonic acid perfluorooctanesulfonic acid may be liberated by the action of concentrated sulfuric acid on the potassium salts of the sulfonic acids and isolated by distillation. The potassium salts are obtained from Aldrich or from Bayer AG, Leverkusen. Trimethylphenylammonium hydroxide may be produced from trimethylphenylammonium chloride (Aldrich) by means of ion exchange on the anion exchanger Lewatit® 500 (Bayer AG). Tetraethylammonium hydroxide and benzyltrimethylammonium hydroxide are obtainable from Aldrich.

TABLE 4

Plastics compositions

| Example | Composition | Melt temperature | Dust test |
|---|---|---|---|
| 3.1 | 0.3% perfluorobutanesulfonic acid tetraethylammonium salt + 0.025% triphenylphosphine + 0.3% 2-(2'-hydroxy-3'-(2-butyl)-5'-(tert-butyl)phenyl)benzotriazole | 320° C. | + |
| 3.2 | 0.3% perfluorobutanesulfonic acid benzyltrimethylammonium salt + 0.025% triphenylphosphine + 0.3% 2-(2'-hydroxy-3'-(2-butyl)-5'-(tert-butyl)phenyl)benzotriazole | 320° C. | + |
| 3.3 | 0.3% perfluorooctanesulfonic acid trimethylphenylammonium salt + 0.025% triphenylphosphine + 0.3% 2-(2'-hydroxy-3'-(2-butyl)-5'-(tert-butyl)phenyl)benzotriazole | 300° C. | + |
| 3.4 | 1% perfluorooctanesulfonic acid tetraethylammonium salt + 1% titanium dioxide Cronos C12230 + 0.2% perfluorobutanesulfonic acid potassium salt (Bayer) + 0.09% Teflon 6CN (DuPont) | 300° C. | + |
| 3.5 | 1% perfluorooctanesulfonic acid tetraethylammonium salt + 1% titanium dioxide Cronos C12230 | 300° C. | + |

EXAMPLE 4

In a similar manner to Example 1, plastics compositions are produced from Bayblend® (blend of ABS and bisphenol A polycarbonate of Bayer AG), Apec® (copolycarbonate of Bayer AG) and Pocan® (unreinforced polybutylene terephthalate of Bayer AG) with the quantities of antistatic agent and at the melt temperatures stated in Table 5 and were subjected to the dust test. The results are given in Table 5.

TABLE 5

Action of sulfonic acid salts in further thermoplastics

| Example | Composition | Melt temperature | Dust test |
|---|---|---|---|
| 4.1 | Bayblend FR2000 ® + 3% Bayowet 248 ® | 250° C. | + |
| 4.2 | Bayblend FR2000 ® + 1% Bayowet 248 ® | 250° C. | +/− |
| 4.3 | Bayblend T45 ® + 3% Bayowet 248 ® | 270° C. | + |
| 4.4 | Pocan B1305 ® + 1% Bayowet 248 ® | 260° C. | + |
| 4.5 | Apec ® HT KUI-9201 = 9330 + 0.5% Bayowet 248 ® | 300° C. | + |
| 4.6 | Apec ® HT KU1-9201 = 9330 + 0.5% Bayowet 248 ® | 340° C. | + |

What is claimed is:

1. A light transmitting thermoplastic molding composition comprising
   (i) (co)polycarbonate resin,
   (ii) a sufficient amount of an antistatic salt to render the composition antistatic, wherein the salt conforms to

RA—SO$_3$ X wherein R denotes perfluorinated linear or branched carbon chain having 1 to 30 carbon atoms, A denotes a direct bond or an aromatic nucleus, and X denotes an alkylated and/or arylated member selected from the group consisting of ammonium ion NR'R"R'"R"", sulfonium ion SR'R"R'"R"", imidazolinium ion and tropylium ion wherein R', R", R'" and R""independently one of the others denote halogenated or non halogenated, linear or branched carbon chains having 1 to 30 carbon atoms or a $C_{1-4}$-(alkyl)aromatic radical.

2. The molding composition of claim 1 wherein the salt is at least one member selected from the group consisting of perfluorooctanesulfonic acid tetraethylammonium salt, perfluorobutanesulfonic acid tetraethylammonium salt, perfluorooctanesulfonic acid benzyltrimethylammonium salt, perfluorobutanesulfonic acid benzyltrimethylammonium salt, perfluorooctanesulfonic acid trimethylphenylammonium salt, perfluorobutanesulfonic acid trimethylphenylammonium salt, perfluorobutanesulfonic acid dimethyldiphenylammonium salt, perfluorooctanesulfonic acid dimethyldiphenylammonium salt, perfluorobutanesulfonic acid trimethylneopentylammonium salt, perfluorooctanesulfonic acid trimethylneopentylammonium salt, perfluorobutanesulfonic acid dimethyldineopentylammonium salt and perfluorooctanesulfonic acid dimethyldineopentylammonium salt.

3. The molding composition of claim 1 wherein the amount is 0.01 to 2 percent relative to the weight of the composition.

4. The molding composition of claim 1 wherein the salt is perfluoro-octanesulfonic acid tetraethylammonium.

5. A molded article comprising the molding composition of claim 1.

* * * * *